No. 722,388. PATENTED MAR. 10, 1903.
W. SCOTT.
DRIVING MECHANISM.
APPLICATION FILED JULY 29, 1897.
NO MODEL.
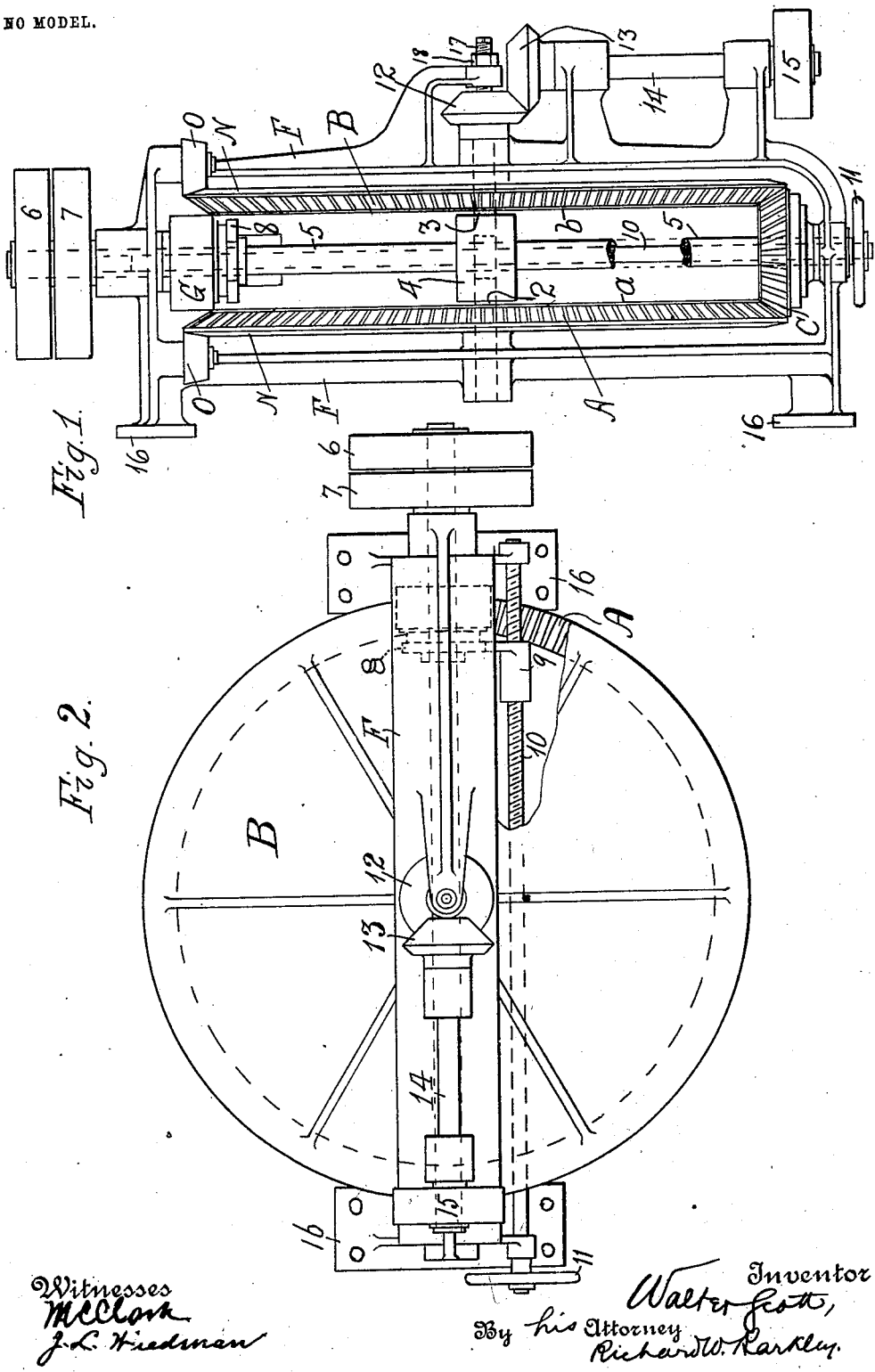

UNITED STATES PATENT OFFICE.

WALTER SCOTT, OF PLAINFIELD, NEW JERSEY.

DRIVING MECHANISM.

SPECIFICATION forming part of Letters Patent No. 722,388, dated March 10, 1903.

Application filed July 29, 1897. Serial No. 646,422. (No model.)

*To all whom it may concern:*

Be it known that I, WALTER SCOTT, a citizen of the United States, and a resident of Plainfield, in the county of Union and State of New Jersey, have invented certain new and useful Improvements in Driving Mechanism, of which the following is a specification.

The present invention relates to mechanism for transmitting power or motion.

The primary object of the invention is to transmit the motion at variable speeds.

To carry out the object of the invention, I provide two parallel rotatable disks or flat rings, place a drive-shaft between the said disks, but not in contact therewith, and provide the said shaft with a friction-wheel which rotates therewith and engages both said disks frictionally in order to drive the same. I also provide means for combining the motion of the two disks in one rotary motion, which may be that of one of the shafts with or on which the disks rotate. In some cases I so mount the driving-wheel on the drive-shaft that it may move along the same, but cannot rotate independently thereof, and move the said driving-wheel farther in or out between the said disks, and thus vary the speed at which the disks are driven thereby, or I may move both wheel and shaft endwise for the same purpose. In order to conveniently move the said driving-wheel on the shaft, I may provide a lever, as a hand-wheel, and connections therefrom to the said driving-wheel in order to move the same upon the shaft. In order to transmit the motion of the two disks to a single shaft, I sometimes place these disks upon and secure them to the smaller ends of frustums of cones, such as bevel-gears, and employ a cone-shaped part or transmitter between the two said cone-shaped parts to transmit motion from one to the other. I may also connect one or more of the cone-shaped parts with a shaft or shafts.

My invention is illustrated in the accompanying drawings, forming part of this specification, in which—

Figure 1 is a view at right angles to the axes of the disks, showing the disks, bevel-gears upon which they are fast, the bevel-gear transmitter, the drive-shaft, the drive-wheel, a suitable framing, and other parts. Fig. 2 is a view of the mechanism shown in Fig. 1 from the right of said figure.

The reference-letter F indicates a suitable frame, in which the parts are suitably journaled or mounted.

The references $a$ $b$ indicate the friction-disks, which in the instance shown are rigidly secured to or are integral with the bevel-gears A B. The gears A B are placed upon shafts 2 3, and the gear B at least is secured to its shaft to rotate therewith. The shafts 2 3 are journaled in suitable boxes in the frame F and in a bearing-block 4 between the disks.

The reference C indicates a bevel-gear which meshes with the gears A B, the gear C being suitably journaled in the framework F.

In the space between the disks I place a drive-shaft 5, which may be hollow, and journal the same in the frame F and in the bearing-block 4, or the said drive-shaft may extend all the way across the frame F and have the bevel-gear C loosely mounted thereon. The drive-shaft 5 is provided with fast and loose pulleys 6 7 or other means by which it is driven from a suitable source of power, as a steam or gas engine or air or electric motor. The shaft 5 is provided with a friction drive-wheel G, which is so mounted thereon that it must rotate therewith while it may be moved longitudinally of the shaft. This wheel G is of a size suitable for engagement with and transmitting to the said disks $a$ $b$. I provide this drive-wheel G with a suitably-grooved collar and place in engagement therewith a fork 8, which extends from an internally-screw-threaded sleeve 9. A screw-rod is suitably journaled in the frame F to have motion of rotation only and is provided with a hand-wheel 11, by which it is turned. This screw-rod engages with the sleeve 9 aforesaid and through the fork 8 serves to move the wheel G radially of the disks. The speed of the drive-shaft 5 remaining constant, the speed at which the disks $a$ $b$ are driven depends upon the distance of the wheel G from the centers of the disks, and this distance is regulated by the hand-wheel 11 and the described connections to the wheel G. The shaft 3 of the bevel-gear B is in the case shown provided with a bevel-gear 12, which meshes with a second bevel-gear 13 on a shaft 14, journaled in the framework F, as shown. The shaft 14 may be provided with a belt-pulley 15.

The frame F is shown as being provided with perforated flanges 16, by means of which it may be attached to walls or overhead beams or to a floor.

In order to provide for wear and consequent looseness of parts, I show a means for adjusting the positions of the disks relatively to the center of the drive-shaft 5. The frame F is provided with a screw 17, which passes therethrough and bears against the end of the shaft 3. The screw 17 engages with a suitably-threaded perforation in the frame and is provided with a jam-nut 18. By means of this screw the gear B and its disk $b$ are moved in a direction at right angles to the shaft 5. As the case shown is intended for attachment under overhead beams or ceilings rather than otherwise, I do not show a like screw for moving the gear A and its disk $a$ toward or from the shaft 5, inasmuch as the weight of these parts will hold them down upon the bevel C and the drive-wheel G.

I sometimes provide a couple of bearing-rollers for coaction with the exterior surfaces or backs of the disks or the gears or other parts thereon in order to prevent loss by distortion of the disk. I illustrate such construction in Fig. 1, wherein the back faces of the gears A B are provided with tracks N, and the frame F is provided with two coned rollers O, which coact with said tracks at a point opposite where the drive-wheel G coacts with the friction-disks $a$ $b$, or rather at the end of the radius of the said disks along which the drive-wheel coacts with the disks at any point between the center of the disks and the edge thereof.

It is obvious that I may, if I so desire, drive the disks or members by more than one drive-wheel G. Thus I may have a number of shafts extending into the space between the disks and provide each with a drive-wheel. I may also take off the motion from either or both shafts 2 3 or elsewhere. I may also employ one of the disks $a$ $b$ merely as a means for preventing springing of the drive-shaft 5 and not transmit its motion to the other disk or its shaft. The means for transmitting the motion of one disk to the other or for combining the motions of the two may be disks or cylindrical wheels engaging with the faces of the disks $a$ $b$.

For the sake of brevity in the claim I shall use the term "disk" or "disks" to designate the member or members driven by friction from the drive wheel or wheels whatever may be the actual form of the said member, whether it be a disk, as ordinarily understood, or a ring or annulus or other form.

What I claim is—

The combination of the frame F, two parallel rotatory disks journaled therein with vertically-disposed shafts, means for raising and lowering the lower shaft with its disk the upper shaft with its disk being free, the bevel-gears A B on said disks, the bevel-gear C intermediate gears A B, the drive-wheel between movable endwise and engaging the inner faces of said disks, and means for moving said drive-wheel, with pressure-wheels coacting with the outer faces of said disks, substantially as described.

Signed at New York, in the county of New York and State of New York, this 13th day of July, A. D. 1897.

WALTER SCOTT.

Witnesses:
 MAY F. PETITTE,
 RICHARD W. BARKLEY.